United States Patent
Keller et al.

(10) Patent No.: US 8,844,561 B2
(45) Date of Patent: Sep. 30, 2014

(54) ISOLATION VALVE WITH INTEGRATED SENSOR

(75) Inventors: Robert Dean Keller, Davisburg, MI (US); Daniel Lee Pifer, Chelsea, MI (US)

(73) Assignee: Eaton Corporation, Cleveland, OH (US)

( * ) Notice: Subject to any disclaimer, the term of this patent is extended or adjusted under 35 U.S.C. 154(b) by 442 days.

(21) Appl. No.: 13/011,226

(22) Filed: Jan. 21, 2011

(65) Prior Publication Data

US 2011/0284781 A1    Nov. 24, 2011

Related U.S. Application Data

(60) Provisional application No. 61/346,641, filed on May 20, 2010.

(51) Int. Cl.

| | | |
|---|---|---|
| *F02M 25/08* | (2006.01) | |
| *G01M 3/28* | (2006.01) | |
| *G01L 19/14* | (2006.01) | |
| *F16K 37/00* | (2006.01) | |
| *G01L 19/00* | (2006.01) | |
| *F16K 31/06* | (2006.01) | |
| *G01L 15/00* | (2006.01) | |

(52) U.S. Cl.
CPC ......... *F02M 25/0836* (2013.01); *G01M 3/2876* (2013.01); *G01L 19/147* (2013.01); *F16K 37/005* (2013.01); *G01L 19/0092* (2013.01); *F16K 31/0655* (2013.01); *G01L 15/00* (2013.01)
USPC ...... 137/487.5; 123/516; 123/521; 73/114.39

(58) Field of Classification Search
CPC .................................. F16K 31/0655
USPC .......................... 73/114.39; 123/516, 518–521; 137/487.5
See application file for complete search history.

(56) References Cited

U.S. PATENT DOCUMENTS 5,803,056 A    9/1998  Cook et al.
5,845,625 A *  12/1998  Kidokoro et al. ............. 123/520

(Continued)

FOREIGN PATENT DOCUMENTS

| EP | 770349 A1 * | 5/1997 |
|---|---|---|
| WO | 99/50551 A1 | 10/1999 |
| WO | WO 03017703 A1 * | 2/2003 |
| WO | WO 2005040793 A1 * | 5/2005 |

OTHER PUBLICATIONS

European Patent Office; International Search Report and Written Opinion issued in counterpart International Application No. PCT/IB2012/000076. Date of Mailing Jul. 31, 2012.

*Primary Examiner* — John Rivell
*Assistant Examiner* — Angelisa Hicks
(74) *Attorney, Agent, or Firm* — Dykema Gossett PLLC

(57) ABSTRACT

An isolation valve has an electrically-actuated solenoid valve, at least one port having a port extension, and a sensor assembly coupled to the port extension. The sensor assembly includes a printed circuit board, an integrated circuit disposed on the circuit board, and at least one pressure sensor coupled to the port extension to measure a vapor pressure in the port extension. In one embodiment, a single sensor assembly can monitor pressure at two or more ports. By integrating the sensor assembly into the isolation valve, the valve has a compact assembly that is easy to install in a vapor control system.

21 Claims, 5 Drawing Sheets

(56) References Cited

U.S. PATENT DOCUMENTS

| | | | |
|---|---|---|---|
| 6,957,663 B2* | 10/2005 | Hirota et al. | 137/613 |
| 6,964,193 B2* | 11/2005 | Kobayashi et al. | 73/114.39 |
| 7,028,674 B2* | 4/2006 | Veinotte | 123/518 |
| 7,051,718 B2* | 5/2006 | Tsuruta et al. | 123/519 |
| 7,152,587 B2* | 12/2006 | Suzuki | 123/518 |
| 7,338,136 B2* | 3/2008 | Nakayama et al. | 303/3 |
| 7,347,192 B2* | 3/2008 | Perry et al. | 123/518 |
| 7,537,019 B2* | 5/2009 | Ting et al. | 137/14 |
| 7,743,750 B2* | 6/2010 | Ritz et al. | 123/509 |
| 2002/0000975 A1* | 1/2002 | Perkins et al. | 345/168 |
| 2004/0004967 A1* | 1/2004 | Nakatsugawa et al. | 370/400 |
| 2005/0044935 A1 | 3/2005 | Barrera et al. | |
| 2007/0131601 A1* | 6/2007 | Najmolhoda et al. | 210/222 |
| 2008/0115844 A1* | 5/2008 | Teichmann et al. | 137/557 |
| 2009/0194831 A1* | 8/2009 | Casey et al. | 257/419 |
| 2009/0277531 A1* | 11/2009 | Pongraz et al. | 141/4 |
| 2010/0269921 A1 | 10/2010 | Pifer et al. | |

* cited by examiner

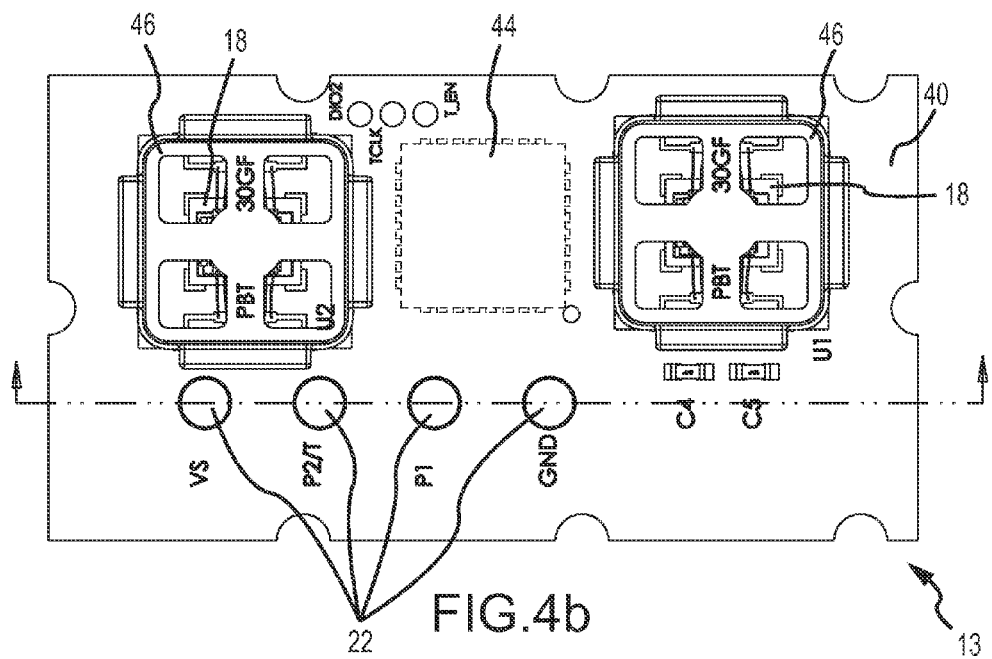
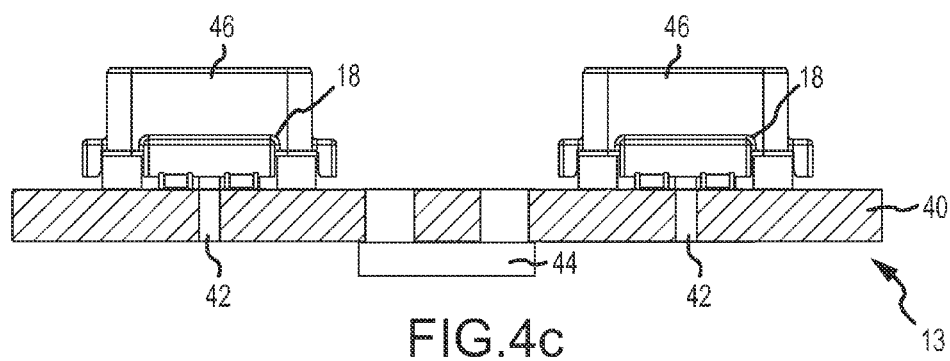

ISOLATION VALVE WITH INTEGRATED SENSOR

CROSS-REFERENCE TO RELATED APPLICATION(S)

This application claims the benefit of U.S. Provisional Application Ser. No. 61/346,641, filed May 20, 2010, the entire contents of which is hereby incorporated by reference.

TECHNICAL FIELD

The present invention relates to an isolation valve assembly that includes a sensor integrated with the valve to measure at least one valve operating characteristic.

BACKGROUND OF THE INVENTION

Valves are employed in a multitude of industries to control flow of liquids and/or gases. One application for such control valves appears in vehicles with stored fuel to control a vehicle's evaporative emissions resulting from fuel vapors escaping from the vehicle's fuel system. Evaporative emissions of modern vehicles are strictly regulated in many countries. To prevent fuel vapors from venting directly to the atmosphere, a majority of vehicles manufactured since the 1970s include specifically designed evaporative emissions systems. Additionally, in recent years vehicle manufacturers began developing fully sealed fuel delivery to their engines.

In a typical evaporative emissions system, vented vapors from the fuel system are sent to a purge canister containing activated charcoal. The activated charcoal used in such canisters is a form of carbon that has been processed to make it extremely porous, creating a very large surface area available for adsorption of fuel vapors and/or chemical reactions. During certain engine operational modes, with the help of specifically designed control valves, the fuel vapors are adsorbed within the canister. Subsequently, during other engine operational modes, and with the help of additional control valves, fresh air is drawn through the canister, pulling the fuel vapor into the engine where it is burned.

Emissions systems having higher operational pressures may need specialized isolation valves to handle larger pressure ranges. However, there is a desire for an isolation valve that can monitor and control vapor flow at high pressures while remaining compact and easy to install.

SUMMARY OF THE INVENTION

An isolation valve according to one embodiment of the invention comprises an electrically-actuated solenoid valve, at least one port having a port extension, and a sensor assembly coupled to the port extension. The sensor assembly includes a printed circuit board, an integrated circuit disposed on the circuit board, and at least one pressure sensor coupled to at least one port extension to measure a vapor pressure in the port extension.

An isolation valve according to another embodiment of the invention comprises an electrically-actuated solenoid valve, a pressure-actuated relief valve, a fuel tank port having a first port extension, and a canister port that is offset from the fuel tank port in either a vertical direction and/or a horizontal direction and having a canister port extension. The valve also has a sensor assembly coupled to both the fuel tank port extension and the canister port extension. The sensor assembly includes a printed circuit board, an integrated circuit disposed on the circuit board, a temperature sensor, at least one pressure sensor coupled to the fuel tank extension and/or the canister port extension to measure a vapor pressure, a plurality of terminals, and a connector that forms a signal path from the terminals to a controller. In this embodiment, the sensor assembly is coupled to both the fuel port extension and the canister port extension, and the fuel tank port extension and the canister port extension extend substantially parallel to each other between their respective ports and the sensor assembly. The solenoid valve and the pressure-actuated relief valve selectively control vapor flow between the fuel tank port and the canister port.

BRIEF DESCRIPTION OF THE DRAWINGS

FIG. 4b is a top view of one embodiment of a sensor assembly to be integrated into the valve assembly of FIG. 1;

FIG. 4c is a side sectional view of one embodiment of a sensor assembly to be integrated into the valve assembly of FIG. 1.

DETAILED DESCRIPTION OF THE INVENTION

Figure 1:
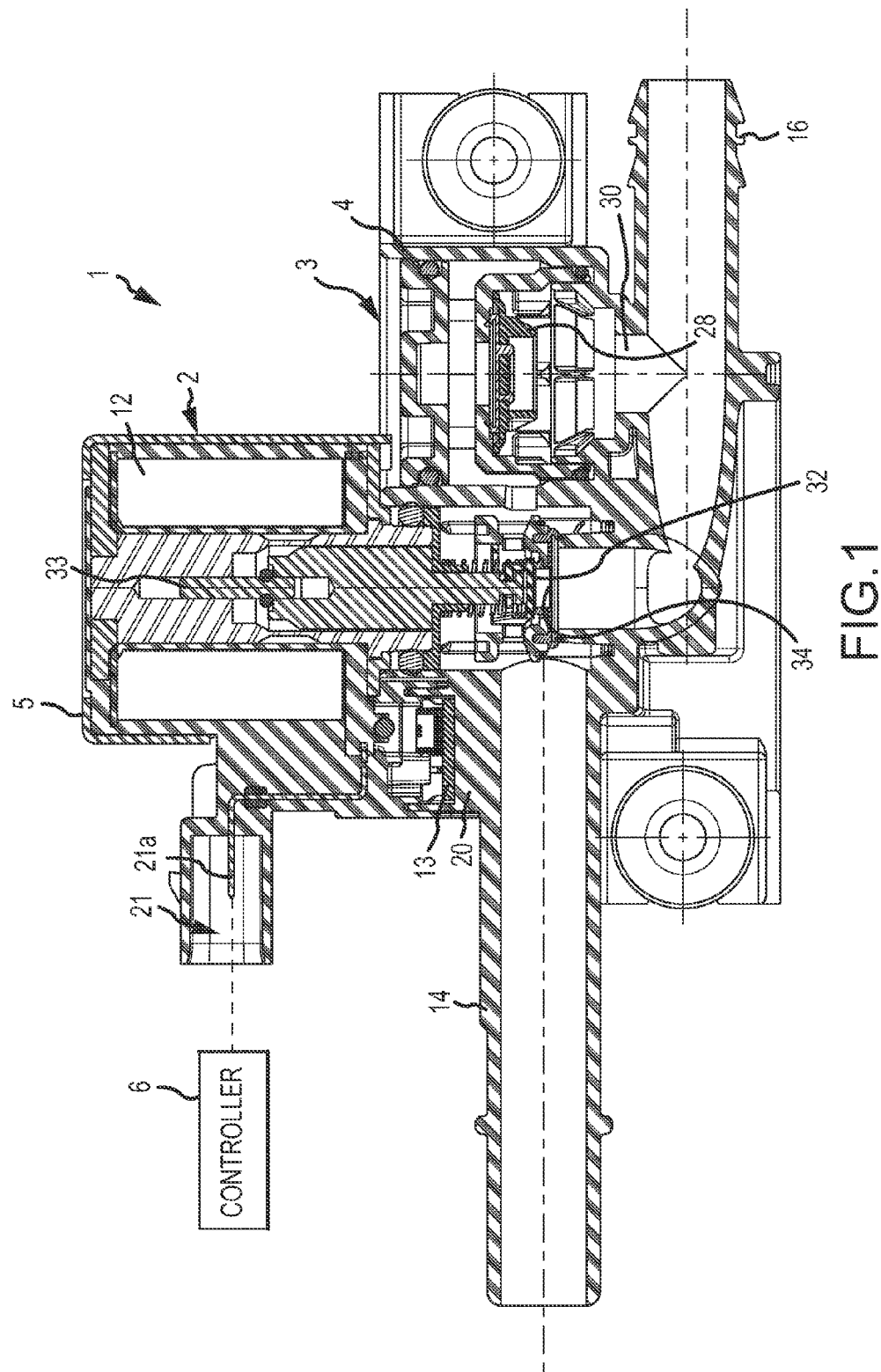
FIG. 1 is a cross-sectional view of a valve assembly having an integrated sensor according to one embodiment of the invention.
Figure 2:
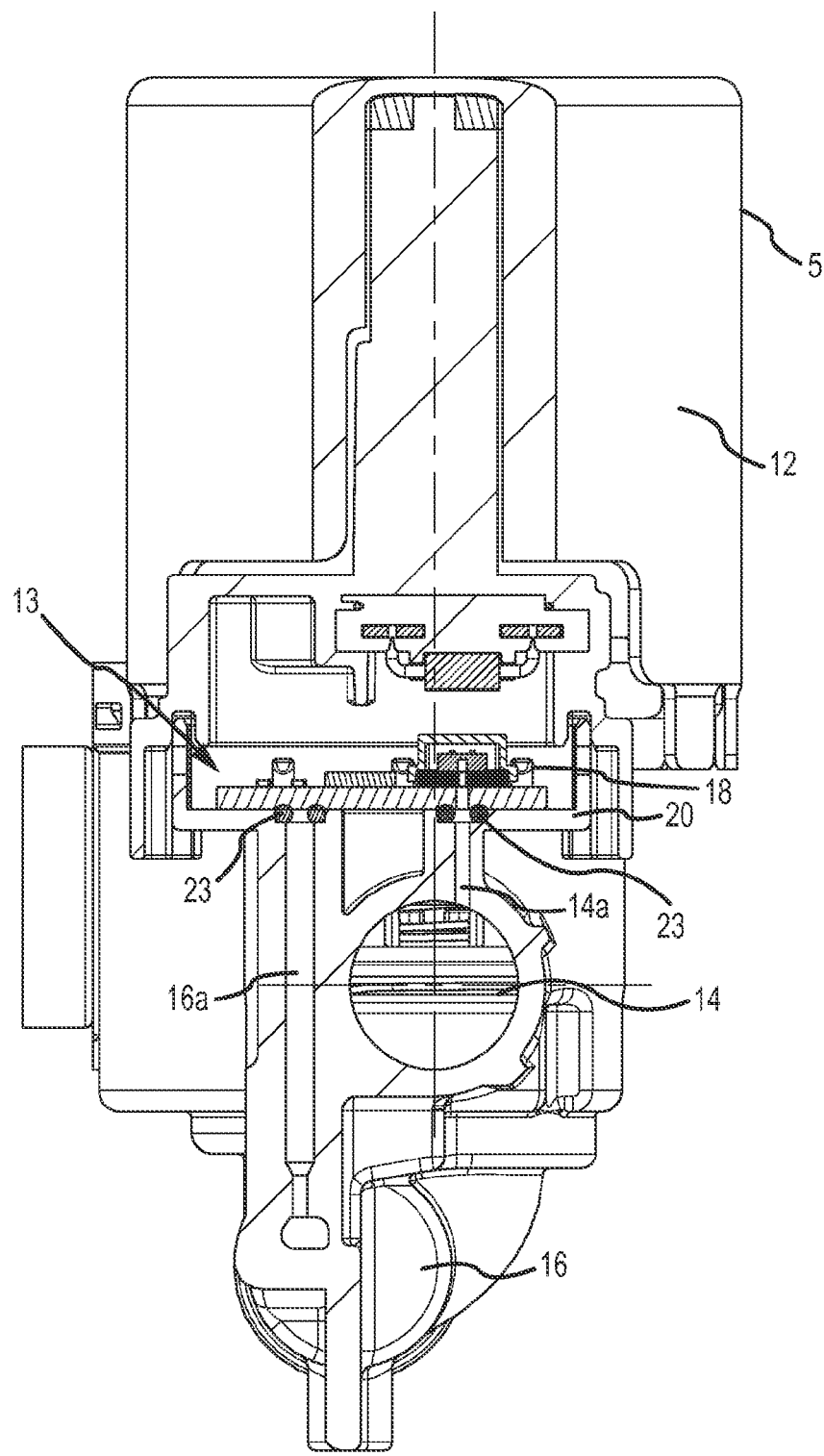
FIG. 2 is another cross-sectional view of the valve assembly of FIG. 1.
Figure 3:
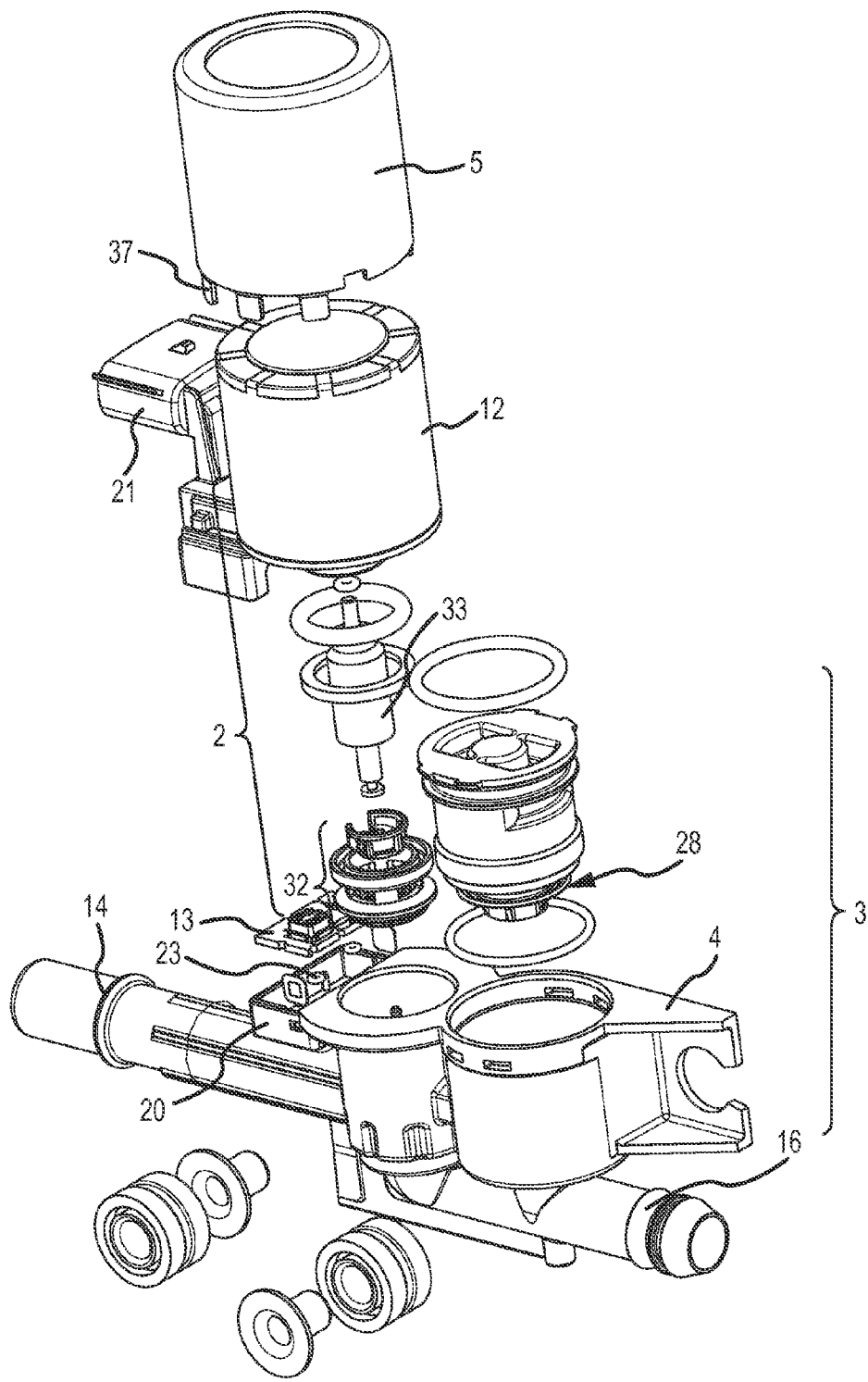
FIG. 3 is an exploded view of the valve assembly shown in FIG. 1.

FIGS. 1 through 3 illustrate an isolation valve 1 according to one embodiment of the invention. The isolation valve 1 includes a coil assembly 2 and a valve assembly 3. The valve assembly 3 includes a valve housing 4 that houses internal components of the valve assembly 3 in a compact manner, while the coil assembly 2 includes a coil housing 5 that houses the internal components of the coil assembly 2, including but not limited to a solenoid 12 and a sensor assembly 13, which may both be controlled by a controller 6. In one embodiment, the sensor assembly 13 is heat-staked into the valve housing 4 and covered by the coil assembly 2. However, other methods of incorporating the sensor assembly 13 into the isolation valve 1 may be used without departing from the scope of the invention.

The isolation valve 1 may be configured to control vapor flow. In one application, the isolation valve 1 controls vapor flow between a fuel tank and a purge canister via a first port 14 and a second port 16, but the isolation valve 1 may be used in other applications as well. For explanatory purposes only, the first port 14 may referred to herein as an inlet port or fuel tank port and the second port 16 may be referred to herein as an outlet port or a canister port, but those of ordinary skill in the art will understand that the ports 14, 16 can have any function without departing from the scope of the invention. Moreover, the valve assembly 3 may include multiple ports and outlets and still be within the scope of the invention.

As shown in FIGS. 1 and 2, the fuel tank port 14 and canister port 16 may be offset from each other both vertically and horizontally. Although FIG. 2 shows the tank port 14 above and to the right the canister port 16, other orientations may be used without departing from the scope of the invention. This offset configuration allows a tank port extension 14a and a canister port extension 16a to be disposed next to each other so that they can both reach the same sensor assembly 13, allowing the single assembly 13 to monitor multiple pressures, such as fuel tank pressure and canister pressure, by including multiple pressure sensors 18 on the same sensor assembly 13. Note that the ports 14, 16 and their corresponding extensions 14a, 16a can have any configuration and orientation as long as both of the ports 14, 16 reach the sensor assembly 13, and the extensions 14a, 16a may even be bent at various angles to accomplish this.

Figure 4A:
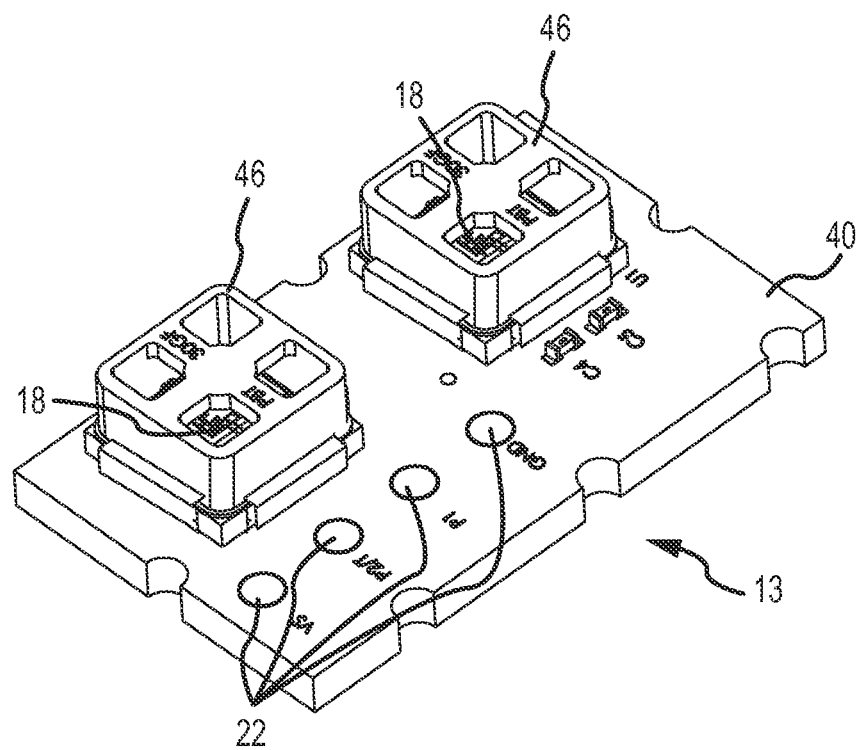
FIG. 4a is a perspective view of one embodiment of a sensor assembly to be integrated into the valve assembly of FIG. 1.

The sensor assembly 13 itself may be disposed in a tray 20, which may be formed as part of the valve housing 4. The tray 20 may be configured to accommodate a connector 21 that includes connector terminals 21a that provide an electrical link between terminals 22 on the sensor assembly 13 (as shown in FIG. 4a) and any component outside the valve assembly 3. The terminals 21a can be routed in any known manner and may include additional terminals to create the electrical link.

As shown in FIG. 2, the tray 20 may accommodate one or more seals, such as O-rings 23, disposed between the sensor assembly 13 and the port extensions 14a, 16a to ensure a tight seal that directs vapor from the port extensions 14a, 16a to the sensors 18. Those of ordinary skill in the art will understand that other seals may be used without departing from the scope of the invention.

The isolation valve 1 shown in FIGS. 1 through 3 is only one possible example of how the inventive structure can be incorporated. One possible isolation valve 1 that can incorporate the inventive structure is described in co-pending, commonly-assigned U.S. patent application Ser. No. 12/749, 924, filed on Mar. 30, 2010, the disclosure of which is incorporated herein by reference in its entirety. However, the offset configuration and the spatial relationship between the ports 14, 16, the port extensions 14a, 16a, and the sensor assembly 13 can be incorporated into any valve assembly where monitoring of multiple ports is desired.

In one embodiment, the fuel tank port 14 is connected to a fuel tank (not shown) and the canister port 14 is connected to a purge canister (not shown). The valve housing 4 accommodates a relief valve 28 whose components may be combined into a single unit via any appropriate manufacturing process, such as overmolding. The relief valve 28 opens and closes a vent passage 30 in the canister port 16. In one embodiment, the relief valve 28 opens to create a vapor path from the fuel tank to the canister when the fuel tank pressure is above a predetermined pressure value representing an over-pressure condition of the fuel tank.

The coil assembly 2 may include the solenoid 12 arranged inside the coil housing 5. Energization of the solenoid 12 may be triggered by a control signal from the controller 6. In one embodiment, the solenoid-actuated valve 32 may open and close in response to energization and de-energization of the solenoid 12. In one embodiment, the solenoid-actuated valve 32 may include an armature 33 controlled by energization and de-energization of the solenoid 12. The armature 33 may control flow through a passage 34, and the combined operation of the electrically-controlled armature 33 in the coil assembly and the pressure-controlled operation of the relief valve 28 directs vapor flow in the vapor path so that the vapor can flow in a number of ways, including directly from the fuel tank port 14 to the canister port 16, over or under the passage 34, through the passage 34, and/or through the relief valve 28.

More particularly, in one embodiment, when the solenoid actuated valve 32 is energized and the tank pressure reaches a predetermined level, the armature 33 withdraws and opens the passage 34 to open a vapor path and allow vapor to flow from the fuel tank to the canister. The specific vapor path taken by vapor flowing through the solenoid actuated valve 32 and/or the relief valve 28 will depend on the combination of the tank pressure and the energization state of the solenoid 12, which controls the open/closed position of the solenoid actuated valve 32.

In the embodiment shown in FIGS. 1 through 3, the coil housing 5 may be attached to the valve housing 4 via tabs 37 formed on the coil housing 5.

FIGS. 4a, 4b, and 4c show one embodiment of the sensor assembly 13 to be integrated into the valve assembly 3. The assembly 13 may include a printed circuit board (PCB) 40 supporting one or more of the pressure sensors 18. The PCB 40 has one or more holes 42 aligned with the pressure sensors 18, which are in turn aligned with the fuel tank port extension 14a and the canister port extension 16a to provide a vapor path between the fuel tank port 14, the canister port 16, and their corresponding pressure sensors 18. The sensor assembly 13 may also include an application-specific integrated circuit (ASIC) 44 to receive signals from the pressure sensors 18, process them, and generate an output signal that is output to a processor (not shown).

In one embodiment, the ASIC 44 may be placed on the underside of the PCB 40 to make more room for the pressure sensors 18. Those of ordinary skill in the art will understand that the components attached to the PCB 40, including the pressure sensors 18 and ASIC 44, can be configured in any manner to form the sensor assembly 13 without departing from the scope of the invention. Also, the pressure sensors 18 may be disposed underneath covers 46

In one embodiment, the sensors 18 may measure fuel tank pressure in two ranges instead of one to accommodate the large operating pressure range found in isolated fuel systems. Small pressure variations may be measured with high resolution, while larger pressure variations may be measured with lower resolution. The specific pressure ranges and resolution levels selected for the sensors 18 may be based on, for example, the particular application in which the isolation valve 1 is used or customer specifications. In one example, one sensor 18 on the assembly 13 may measure a pressure range from −12 kPa to 30 kPa while another sensor 18 on the same assembly 13 may measure a pressure range from −4 kPa to +4 kPa.

The ASIC 44 may also include a temperature sensor that generates a signal reflecting the fuel vapor temperature. In one embodiment, the temperature sensor in the ASIC 44 indicates the temperature in the tray 20, which corresponds to a temperature. Based on the pressure and temperature readings obtained by the ASIC 44, the controller 6 can determine whether a given pressure change is due to a leak or due to a fuel temperature change affecting the fuel vaporization rate. In one embodiment, the small range/high resolution pressure sensing, large range/low resolution pressure sensing, and temperature sensing are all conducted via the single assembly 13 shown above.

For example, if the pressure sensors 18 indicate a pressure drop and the temperature sensor in the ASIC 44 indicates a temperature drop, this may indicate that the pressure drop is due to decreased fuel vaporization instead of a system leak. In one embodiment, one pressure sensor 18 measures pressure over a small range and at high resolution to monitor canister pressure and the other pressure sensors measures pressure over a large range at a lower resolution to monitor tank pressure. However, additional sensors 18 and/or different types of sensors may be used to measure other ranges and resolutions if desired. Also, a single sensor 18 may have multiple ranges, resolutions, and functions, eliminating the need for multiple sensors 18.

While the best modes for carrying out the invention have been described in detail, those familiar with the art to which this invention relates will recognize various alternative designs and embodiments for practicing the invention within the scope of the appended claims.

The invention claimed is:

1. An isolation valve, comprising:
a solenoid-actuated valve;
at least one port having a port extension;
a sensor assembly coupled to the port extension, wherein the sensor assembly includes
a printed circuit board,
an integrated circuit disposed on the circuit board, and
at least one pressure sensor disposed on the circuit board and coupled to said at least one port extension to measure a vapor pressure in said at least one port extension;
wherein said at least one pressure sensor is attached to a first side of the printed circuit board and the integrated circuit is disposed on a second side of the printed circuit board.

2. The isolation valve of claim 1, wherein said at least one port comprises:
a first port having a first port extension, and
a second port that is offset from the first port, the second port having a second port extension;
wherein the sensor assembly is coupled to both the first and second port extensions.

3. The isolation valve of claim 2, wherein said at least one pressure sensor is a single pressure sensor that measures vapor pressure in both the first and second port extensions.

4. The isolation valve of claim 2, wherein said at least one pressure sensor comprises a first pressure sensor that measures vapor pressure in the first port extension and a second pressure sensor that measures vapor pressure in the second port extension.

5. The isolation valve of claim 2, wherein the first port extension is a fuel tank port extension and the second port extension is a canister port extension.

6. The isolation valve of claim 2, wherein the first and second ports are offset in at least one of a vertical direction and a horizontal direction with respect to each other.

7. The isolation valve of claim 6, wherein the first port extension and the second port extension extend substantially parallel to each other between their respective ports and the sensor assembly.

8. The isolation valve of claim 1, wherein said at least one sensor measures pressure at a large pressure range and a low resolution and also at a small pressure range and a high resolution.

9. The isolation valve of claim 1, wherein said at least one pressure sensor comprises:
a first sensor that measures pressure at a large pressure range and a low resolution, and
a second sensor that measures pressure at a small pressure range and a high resolution.

10. The isolation valve of claim 1, wherein the sensor assembly further comprises a temperature sensor.

11. The isolation valve of claim 1, wherein the sensor assembly includes a plurality of terminals, and wherein the isolation valve further comprises a connector that forms a signal path from the terminals to a controller.

12. The isolation valve of claim 1, further comprising a pressure-actuated relief valve.

13. An isolation valve, comprising:
a solenoid-actuated valve;
a pressure-actuated relief valve;
a fuel tank port having a fuel tank port extension;
a canister port that is offset from the fuel tank port in at least one of a vertical direction and a horizontal direction, the canister port having a canister port extension;
a sensor assembly coupled to the both the fuel tank port extension and the canister port extension, wherein the sensor assembly includes
a printed circuit board,
an integrated circuit disposed on the circuit board,
a temperature sensor,
at least one pressure sensor disposed on the circuit board and coupled to at least one of said fuel tank extension and said canister port extension to measure a vapor pressure,
a plurality of terminals, and
a connector that forms a signal path from the plurality of terminals to a controller;
wherein the sensor assembly is coupled to both the fuel port extension and the canister port extension,
wherein the solenoid-actuated valve and the pressure-actuated relief valve selectively control vapor flow between the fuel tank port and the canister port, and
wherein said at least one pressure sensor is attached to a first side of the printed circuit board and the integrated circuit is disposed on a second side of the printed circuit board.

14. The isolation valve of claim 13, wherein said at least one pressure sensor is a single pressure sensor that measures vapor pressure in both the fuel tank port extension and the canister port extensions.

15. The isolation valve of claim 13, wherein said at least one pressure sensor measures pressure at a large pressure range and a low resolution and also at a small pressure range and a high resolution.

16. The isolation valve of claim 13, wherein said at least one pressure sensor comprises a first pressure sensor that measures vapor pressure in the fuel tank port extension and a second pressure sensor that measures vapor pressure in the canister port extension.

17. The isolation valve of claim 13, wherein said at least one pressure sensor comprises:
a first pressure sensor that measures pressure at a large pressure range and a low resolution, and
a second pressure sensor that measures pressure at a small pressure range and a high resolution.

18. An isolation valve, comprising:
a solenoid-actuated valve;
at least one port having a port extension;
a sensor assembly coupled to the port extension, wherein the sensor assembly includes
a printed circuit board,
an integrated circuit disposed on the circuit board, and
at least one pressure sensor disposed on the circuit board to measure a vapor pressure in said at least one port extension;
wherein said at least one pressure sensor is displaced between a valve housing and a coil housing, and
wherein said at least one pressure sensor is attached to a first side of the printed circuit board and the integrated circuit is disposed on a second side of the printed circuit board.

19. The isolation valve according to claim 18, wherein said at least one pressure sensor is disposed in a tray integrally formed with the valve housing.

20. The isolation valve according to claim 18, wherein said at least one pressure sensor is disposed underneath at least one cover.

21. The isolation valve according to claim 18, wherein said at least one pressure sensor is heat-staked into the valve housing and covered by the coil housing.

\* \* \* \* \*